United States Patent
Audebert et al.

(10) Patent No.: US 8,190,899 B1
(45) Date of Patent: May 29, 2012

(54) SYSTEM AND METHOD FOR ESTABLISHING A REMOTE CONNECTION OVER A NETWORK WITH A PERSONAL SECURITY DEVICE CONNECTED TO A LOCAL CLIENT WITHOUT USING A LOCAL APDU INTERFACE OR LOCAL CRYPTOGRAPHY

(75) Inventors: Yves Louis Gabriel Audebert, Fremont, CA (US); Olivier Clemot, Fremont, CA (US)

(73) Assignee: ActivCard, Suresnes Cedex (FR)

( * ) Notice: Subject to any disclaimer, the term of this patent is extended or adjusted under 35 U.S.C. 154(b) by 97 days.

(21) Appl. No.: 12/650,228

(22) Filed: Dec. 30, 2009

Related U.S. Application Data

(63) Continuation of application No. 09/844,246, filed on Apr. 30, 2001, now abandoned.

(51) Int. Cl.
*G06F 21/00* (2006.01)
(52) U.S. Cl. .................... 713/172; 726/9; 705/66
(58) Field of Classification Search ........................ None
See application file for complete search history.

(56) References Cited

U.S. PATENT DOCUMENTS

| | | | | |
|---|---|---|---|---|
| 5,276,735 A * | 1/1994 | Boebert et al. | ............... | 713/167 |
| 5,455,863 A * | 10/1995 | Brown et al. | ............... | 380/247 |
| 5,499,297 A * | 3/1996 | Boebert | ............... | 713/159 |
| 5,657,390 A * | 8/1997 | Elgamal et al. | ............... | 713/151 |
| 5,761,309 A * | 6/1998 | Ohashi et al. | ............... | 713/156 |
| 5,778,071 A * | 7/1998 | Caputo et al. | ............... | 713/159 |
| 5,917,168 A * | 6/1999 | Nakamura et al. | ............... | 235/379 |
| 6,005,942 A * | 12/1999 | Chan et al. | ............... | 713/187 |
| 6,101,254 A * | 8/2000 | Thiriet | ............... | 380/2 |
| 6,101,255 A * | 8/2000 | Harrison et al. | ............... | 380/52 |
| 6,105,008 A * | 8/2000 | Davis et al. | ............... | 705/41 |
| 6,131,811 A * | 10/2000 | Gangi | ............... | 235/380 |
| 6,144,671 A * | 11/2000 | Perinpanathan et al. | ..... | 370/409 |
| 6,192,473 B1 * | 2/2001 | Ryan et al. | ............... | 713/168 |
| 6,196,459 B1 * | 3/2001 | Goman et al. | ............... | 235/380 |
| 6,279,047 B1 * | 8/2001 | Bublitz et al. | ............... | 710/11 |
| 6,385,729 B1 * | 5/2002 | DiGiorgio et al. | ............... | 726/9 |
| 6,402,028 B1 * | 6/2002 | Graham et al. | ............... | 235/380 |
| 6,481,632 B2 * | 11/2002 | Wentker et al. | ............... | 235/492 |
| 6,575,360 B1 * | 6/2003 | Hagn | ............... | 235/380 |
| 6,602,469 B1 * | 8/2003 | Maus et al. | ............... | 422/68.1 |
| 6,694,436 B1 * | 2/2004 | Audebert | ............... | 726/9 |
| 6,751,671 B1 * | 6/2004 | Urien | ............... | 709/229 |
| 6,944,650 B1 * | 9/2005 | Urien | ............... | 709/217 |
| 6,993,131 B1 * | 1/2006 | Meyers | ............... | 380/201 |
| 7,028,187 B1 * | 4/2006 | Rosen | ............... | 713/175 |
| 7,042,903 B2 * | 5/2006 | Coulier | ............... | 370/466 |
| 7,046,810 B2 * | 5/2006 | Takada et al. | ............... | 380/284 |
| 7,117,364 B1 * | 10/2006 | Hepper et al. | ............... | 713/176 |
| 2001/0045451 A1 * | 11/2001 | Tan et al. | ............... | 235/375 |
| 2002/0025046 A1 * | 2/2002 | Lin | ............... | 380/282 |
| 2002/0162021 A1 * | 10/2002 | Audebert et al. | ............... | 713/201 |

OTHER PUBLICATIONS

Summons to Attend Oral Proceedings in European Application No. 1 384 212 B1 dated Jun. 12, 2009.
Communication of Notice of Opposition in European Application No. 1 384 212 B1 dated May 7, 2008.
Wolfgang Rankl, et al., "Handbuch der Chipkarten," Handbook of Chipcards-3 (German Edition), Auflage, 1999, pp. 622-640.
Wolfgang Rankl, et al., "Handbuch der Chipkarten- Aufbau- Funktionsweise-Einsatz von Smart Cards," Handbook of Chip Cards Structure- Function- Use of Smart Cards 3 (German Edition), Global System for Mobile Communications- GSM, Auflage, 1999, pp. 689-690.

\* cited by examiner

*Primary Examiner* — Benjamin Lanier
(74) *Attorney, Agent, or Firm* — Muirhead and Saturnelli, LLC

(57) ABSTRACT

System and method for establishing a remote connection over a network with a personal security device connected to a local client without using a local APDU interface or local cryptography.

28 Claims, 7 Drawing Sheets

SYSTEM AND METHOD FOR ESTABLISHING A REMOTE CONNECTION OVER A NETWORK WITH A PERSONAL SECURITY DEVICE CONNECTED TO A LOCAL CLIENT WITHOUT USING A LOCAL APDU INTERFACE OR LOCAL CRYPTOGRAPHY

This is a continuation of application Ser. No. 09/844,246 filed Apr. 30, 2001, the entire contents of which are incorporated by reference herein.

FIELD OF INVENTION

The present invention relates to a data processing method and system for establishing a communications path (the "pipe") over a communications network between a Personal Security Device (PSD) and a Remote Computer System in a way that does not require localized APDU generation to communicate with a PSD nor discloses the security mechanisms implemented in the PSD to a local Client computer.

BACKGROUND OF INVENTION

The current art involving the use of personal security devices (PSD), for example, smart cards, subscriber identity module (SIM) cards, biometric devices, or combinations thereof, requires specialized messaging software or firmware to be installed on a local Client in which the PSD is connected. These specialized routines are used to translate from higher level messaging formats into low-level messaging packets and are generally known in the art as an Application Protocol Data Unit (APDU) Interface. Installing and maintaining APDU Interfaces for a large number of local Clients can be a substantial and costly challenge in a multi-user organization. In addition, Client resources such as disk space, memory and computing resources are unnecessarily tied up by the software, which could be better utilized for other purposes.

Another significant limitation of the current art is that security mechanisms are implemented on a local Client to gain access to secure functions contained within a connected PSD. In a typical secure transaction with a PSD, a cryptographic key are generated in the local Client using API level software, which are subsequently translated into APDU format using an APDU Interface and sent to the PSD to access the Intended secure function.

The potential exposure of secure information weakens the basic functionality of current PSDs, which is to protect private keys and other proprietary information from being unnecessarily disclosed. The limitations of the current art are such that localized key generating mechanisms, APDU interface software and transactions involving this software are potentially vulnerable to compromise by unauthorized programs running on the local Client or by other illicit means intending to monitor the key generation process and thus gaining access to security codes, algorithms and other sensitive data contained within the PSD or elsewhere, These limitations are magnified in a multi-user environment where the ability to control unauthorized access to local Clients and vulnerable software contained therein are limited.

SUMMARY OF INVENTION

This invention resides in a method of generating a communications pipe between a personal security device (PSD) and a Remote Computer System over a network without requiring APDU interface software and/or security mechanism to be installed on a local Client in which a PSD is connected. The improvements comprising relocation of APDU interface and security mechanisms from local Clients in which the PSD is connected to one or more Remote Computer Systems; using a local Client as a host which allows a connected PSD to communicate with one or more Remote Computer Systems over a network. By moving APDU interface and security mechanisms from numerous local Clients to a few secure Remote Computer Systems, the overall data processing system is much easier to maintain and significantly less susceptible to unauthorized access or compromise.

The communications pipe generation may be initiated automatically upon connection of a PSD to a local client, by a client side request for access to information contained on another networked client or remote computer system, or by a remote computer system requesting access to a PSD.

In this invention, APDUs are encapsulated into a common communications protocols, such as TCP/IP, WAP, etc. which are used to communicate between one or more Clients with one or more Remote Computer Systems. A program installed on each local Client and each Remote Computer System separates the incoming low-level APDUs from the incoming message packets and routes the APDUs to a connected PSD via its hardware device interface. In a multi-tasking operating environment, the Client is free to perform other data processing functions while transactions between a PSD and a Remote Computer System using the pipe execute in the background. In situations where a firewall may mask individual client network addresses, remote computer based pipe software should be installed on the proxy server. Other solutions common to virtual private networking may also be employed.

For purposes of this invention a client may be any intelligent device such as a personal computer, laptop, cellular telephone, personal data assistant (PDA), etc. which provides the network communications interface between a PSD and a remote computer system. A remote computer system includes any intelligent device which provides the necessary APDU communications interface between networked devices and a PSD.

In the first embodiment of the invention, a communications pipe is formed when a Remote Computer System generates the proper APDUs which are encapsulated into an agreed upon communications protocol, transmitted (broadcast for general polling or specific IP address of Client) over a network, invoking a reply by one or more PSDs which are subsequently received by the requesting Remote Computer System. The latter described pipe formation process is equivalent to a handshake between a PSD and a Remote Computer System.

This embodiment of the invention is useful in determining the status, identification and other derived information related to responding PSDs. For example, an APDU formatted polling command may be transmitted from the Remote Computer System over a network to all PSDs capable of receiving the command requesting each PSD to return its unique identification number or other some other non-proprietary information. Based on the replies received, it is possible to determine which PSDs are active, their relative location, length of time each PSD has been active, network traffic information, etc. This embodiment of the invention does not require the use of secure communications protocols.

In a second embodiment of the invention, referred to as secure pipe generation, security mechanisms are employed to protect against unauthorized disclosure of proprietary information. The secure pipe generation process is equivalent to the pipe generating process described above but includes the added steps of generating cryptographically secured APDUs, which are then encapsulated into a secure communications protocol, examples of which include TCP/IP with secure socket layer (SSL) encryption, IPsec, etc, to generate a secure pipe between a Remote Computer System and a PSD.

In this embodiment of the invention, APDUs are encrypted using the proper keys to unlock secure applications and data contained within the secure domain of a PSI/Response APDUs containing sensitive or proprietary information are likewise encrypted by the PSD and decrypted by the Remote Computer System.

The cryptographically secured APDUs are encapsulated into outgoing message packets using the agreed communications secure protocol, sent over a network and routed through the PSD hardware interface by the Client and into the PSD as before. This embodiment of the invention is useful in initializing a PSD, personalizing a PSD, accessing secure information contained within a PSD, changing, upgrading or deleting proprietary algorithms or data contained in a PSD, authenticating an end user, etc.

BRIEF DESCRIPTION OF DRAWINGS

A more complete understanding of the present invention may be accomplished by referring to the following Detailed Description and claims, when viewed in conjunction with the following drawings:

DETAILED DESCRIPTION OF PREFERRED EMBODIMENT

This invention provides a method and system to establish a remote communications pipe over a network between a Remote Computer System and a personal security device connected to a host local Client. In this invention, personal security devices (PSD) are intelligent devices such as smart cards, biometric devices, subscriber identification module (SIM) cards, or combinations thereof having a microprocessor, runtime operating environment, an input/output communication port, memory storage including nonvolatile memory and random access memory and embedded software applications.

Two embodiments of the invention are described; the first embodiment in which security mechanisms are not employed and the second embodiment where security mechanisms are employed.

Figure 1:
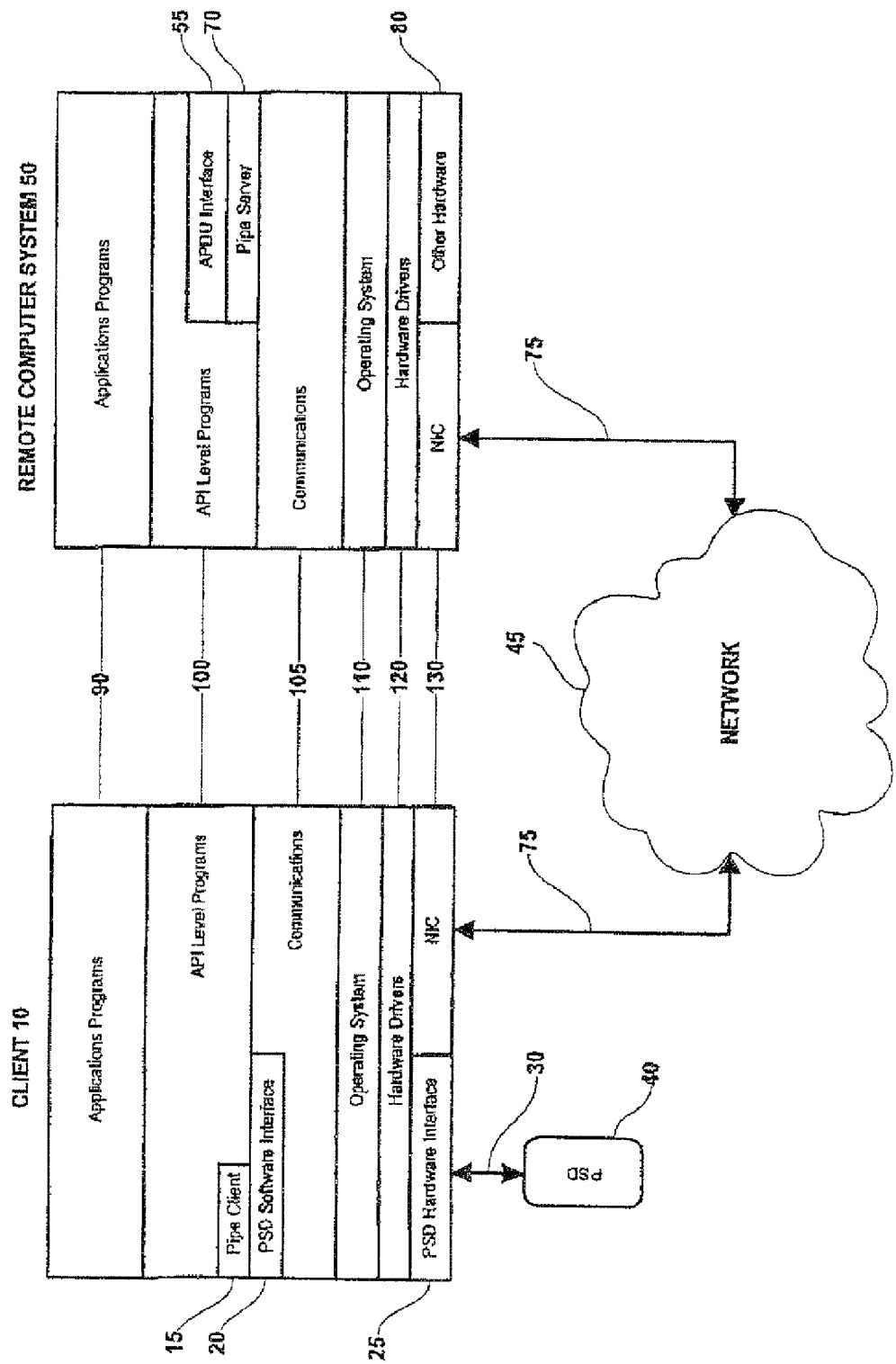
FIG. 1—is a generalized system block diagram for implementing present invention.

Referring now to FIG. 1, a generalized system block diagram of the invention is depicted. The various layers shown are based on the Open System Interconnection model (OSI.) For simplicity, certain layers common to both the Client and Remote Computer System are not shown and should be assumed to be present and incorporated into adjacent layers. The layers common to both a Client and Remote Computer System include:

an Applications Layer 90 which generally contains higher level software applications (e.g. word processor) and a user interface and such as a graphical user interface (GUI);

an Applications Programming Interface level (API) 100 for processing and manipulating data for use by either higher or lower level applications;

a Communications Layer 105 which contains communications programs including secure communications capabilities, which enable a Client to communicate with a Remote Computer System to exchange information in an agreed upon protocol and visa versa;

an Operating System Layer 110 or equivalent runtime environment, which controls the allocation and usage of hardware resources such as memory, central processing unit (CPU) time, disk space, hardware I/O port assignments, peripheral device management;

a Hardware Driver Layer 120 which permits the operating system to communicate and control physical devices connected to the Client's or Remote Computer System's hardware I/O bus; and a Physical Device Layer 130 where network interface cards (NIC) 140 provide the physical connections to a telecommunications network 45. Other hardware devices may also be connected at this level 80.

Client Specific Features

A specialized program contained within the API Level 100 of the Client and referred to as a pipe Client 15, interacts with Communications Programs contained within the Communications Layer 105. The pipe Client 15 functions to separate-encapsulated APDU requests from incoming messaging packets received from a network 45 for processing by a locally connected PSD 40. Alternately, outbound APDU responses generated by a locally connected PSD 40, are processed by the pipe Client for encapsulation into an agreed upon communications protocol by Communications Programs contained within the communications layer 105.

A software driver contained within the communications layer 105 of the Client and referred to as a PSD Software Interface 20 directs incoming APDUs communicated by the Pipe Client 15 into the I/O device port connecting the PSD Hardware Device Interface 25 to the locally connected PSD 40. Outgoing APDUs generated by the PSD are communicated through the PSD Hardware Device Interface 25 through the 110 device port to the PSD Software Interface 20 and subsequently communicated to the Pipe Client 15.

Remote Computer System Specific Features

A first specialized program contained within the API Level 100 of the Remote Computer System 50 and referred to as an APDU interface 55, translates higher level messaging formats into low-level APDU protocols required to communicate with a PSD 40. Alternately, the APDU interface 55 translates incoming APDU responses received from a PSD 40 into higher level messaging formats used by programs in the API Level 55 and Applications Level 90 of the Remote Computer System.

A second specialized program contained within the API Level 100 of the Remote Computer System 50 and referred to as a Pipe Server 70, interacts with Communications Programs contained within the Communications Layer 105. The Pipe Server 70 functions to separate encapsulated APDU requests from incoming messaging packets received from a network 45 for processing by the APDU Interface 55. Alternately, outbound APDU requests translated by the APDU Interface 55, are processed by the pipe server for encapsulation into an agreed upon communications protocol by Communications Programs contained within the communications layer 105.

Other Inventive Features

The connection 30 between the PSD 40 and PSD Hardware Interface 25 includes but is not limited to traditional electrical or optical fiber connections or wireless means including optical, radio, acoustical, magnetic, or electromechanical. Likewise the connection 75 between the Client 10 and the network 45, and the connection 75 between the Remote Computer System 50 and the network 45 may be accomplished analogously.

The network, shown generally at 45, includes both public and private telecommunications networks connected by traditional electrical, optical, electro-acoustical (DTMF) or by other wireless means. Any mutually agreed upon communications protocol capable of encapsulating APDU commands may be employed to establish a communications pipe including open or secure communications protocols.

Figure 2:
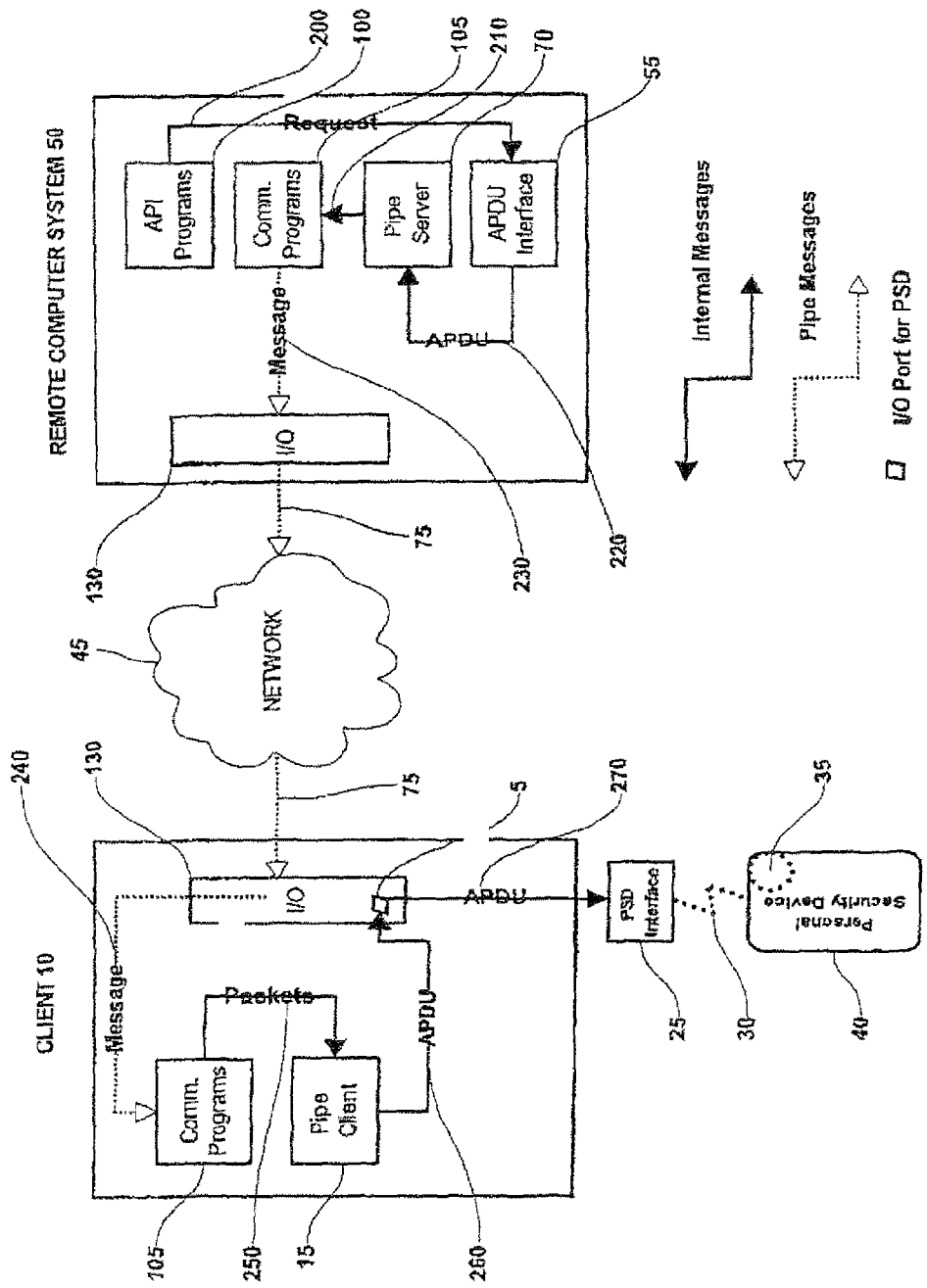
FIG. 2—is a detailed block diagram depicting initiating a remote pipe where non-proprietary information is being requested.

Referring now to FIG. 2, depicts initiating a communications pipe between the Remote Computer System 50 and the PSD 40 connected to a client. In this depiction, Remote Computer System 50 is sending a request to PSD 40 for non-proprietary embedded information 35, for example an identification number. PSD 40 is connected 30 to the local Client 10 using PSD Interface 25. PSD Interface 25 communicates with the Client 10 via hardware device port 5.

To initiate a remote pipe between Remote Computer System 50 and PSD 40, Remote Computer System 50 generates a request 200 by way of API programs 100 which is translated into APDU format 220 by the APDU Interface 55 and sent to the Pipe Server 70 for message encapsulation. The encapsulated APOUs are then sent 210 to the Communications Programs 105 for incorporation into outgoing message packets 230, The message packets 230 containing the encapsulated APDUs are transmitted 75 over the network 45 via a network interface card (I/O) 130. The Client 10, receives the message packets 240 containing the encapsulated APDUs which are received from the network 45 via a network interface card (I/O) 130 installed on the local Client. The incoming messages are processed by Client-side Communications Programs 105 and routed 250 into the Pipe Client 15 for APDU extraction. The extracted APDUs are sent 260 through hardware device port 5, routed 270 into the PSD Interface 25 and sent to PSD 40 via connection 30 for processing within PSD domain 35.

Alternative requests to form a communications pipe 75 between a Remote Computer System 50 and a PSD 40 may be initiated by Client 10 requesting access to information contained on one or more networked local clients, by connecting a PSD 40 to PSD Interface 25 which initiates a request to form a communications pipe 75, or by another remote computer system requesting access to PSD 40.

Figure 3:
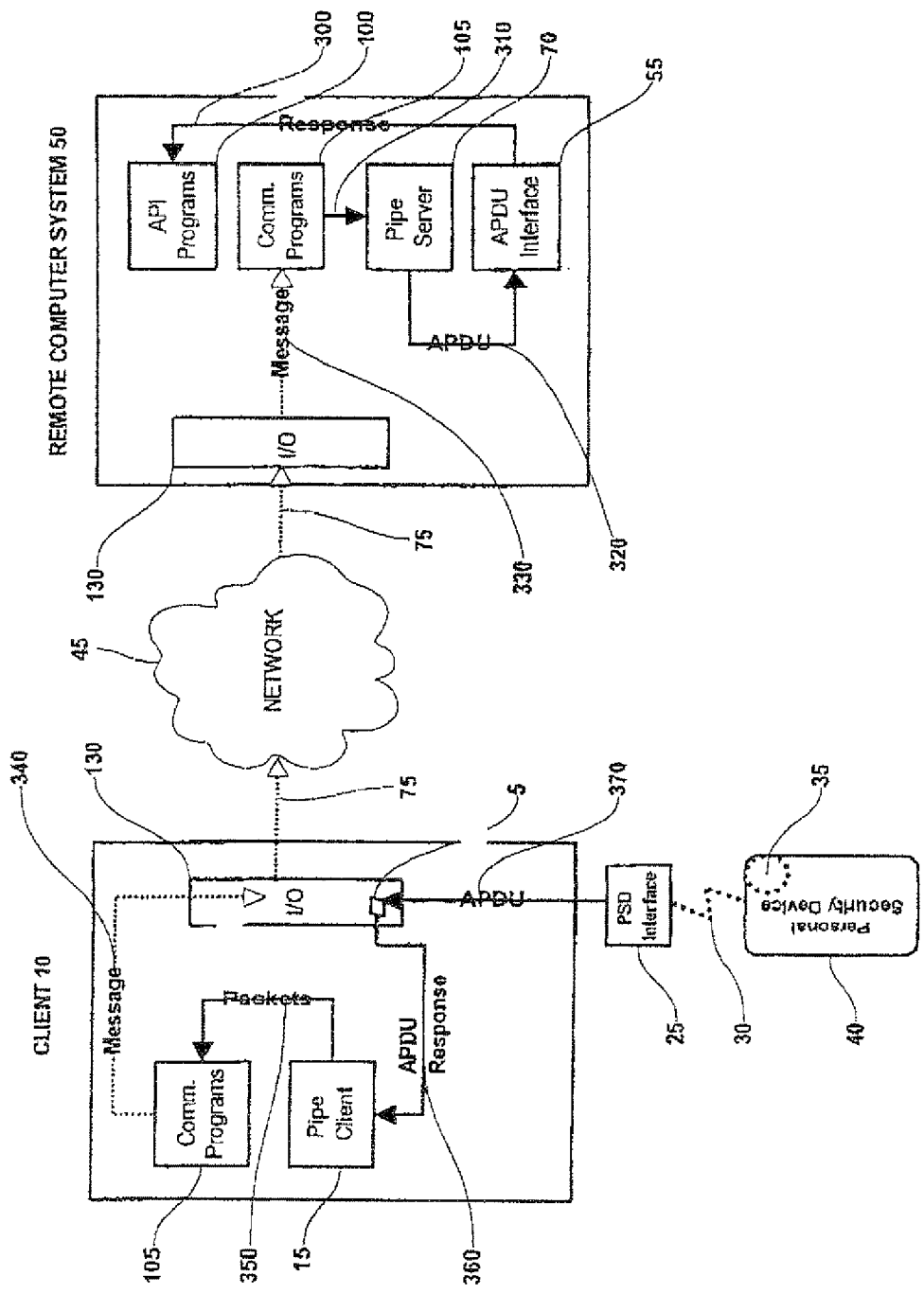
FIG. 3—is a detailed block diagram depicting establishing a remote pipe where non-proprietary Information is being requested.

Referring now to FIG. 3, depicts a PSD response which establishes the communications pipe between PSD 40 and Remote Computer System 50. In this depiction, the request previously received is processed within the PSD domain 35, which generates a response message. The PSD response is sent in APDU format from PSD 40 through connection 30 and into PSD interface 25. The PSD response is then routed 370 through hardware device port 5 and sent 360 to the Pipe Client 15 for processing and encapsulation. The resulting message packets are then sent 350 to the Client-side Communications Programs 105 for incorporation into outgoing message packets 340. The message packets 340 containing the encapsulated APDUs are transmitted 75 over the network 45 via a network interface card (I/O) 130.

The Remote Computer System 50 receives the message packets 330 containing the encapsulated APDUs, which are received from the network 45 via a network interface card (I/O) 130 installed on the Remote Computer System. The incoming messages are processed by server-side Communications Programs 105 and routed 310 into the Pipe Server 70 for APDU extraction. The extracted APDUs are sent 320 to the APDU Interface 55 for processing and translation into a higher-level format and sent 300 to API Level programs 100 for processing and further transactions with the PSD 40 if desired.

Figure 4A:
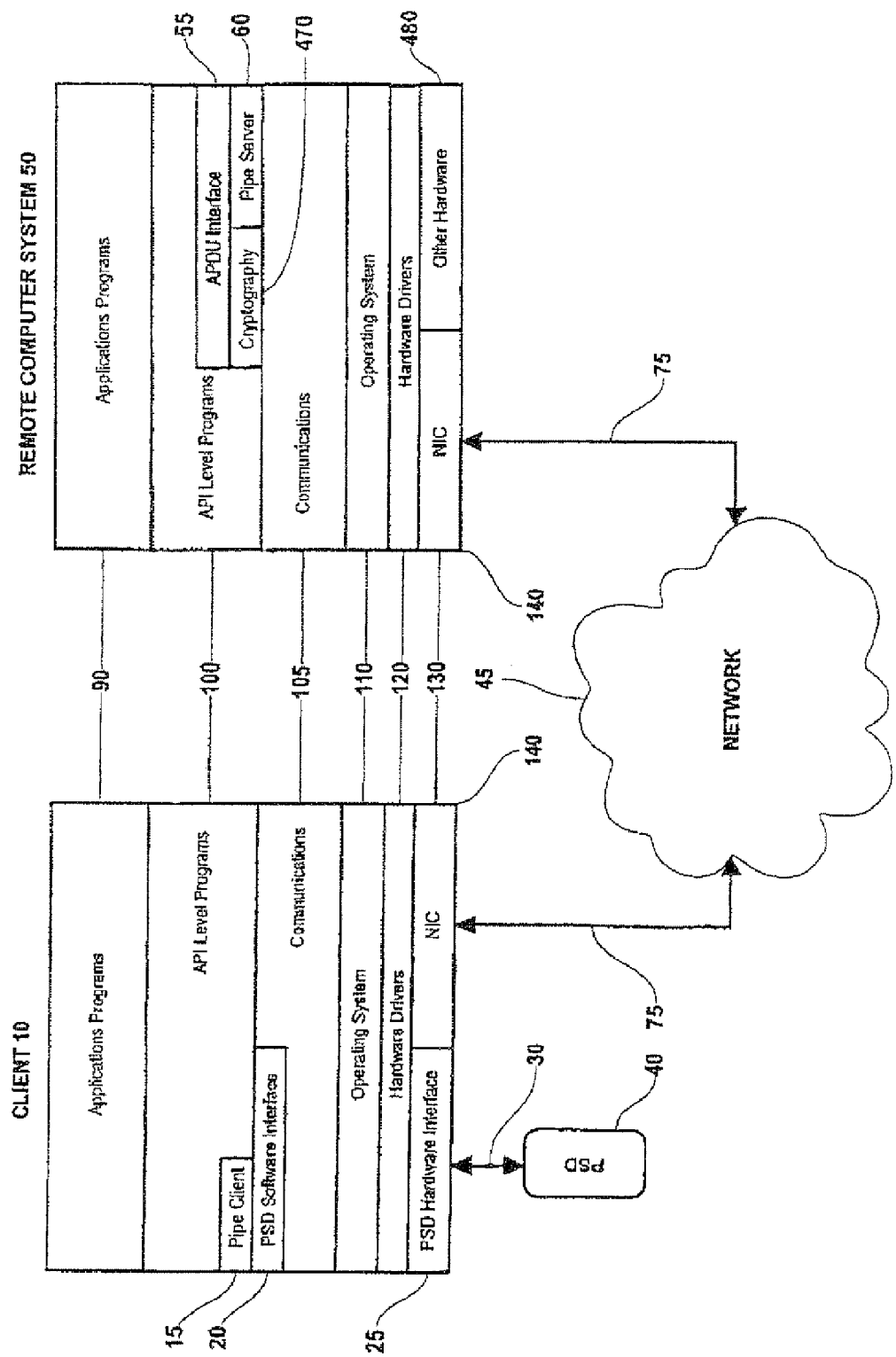
FIG. 4A—is a generalized system block diagram for implementing present invention which includes software-based security mechanisms.

Referring now to FIG. 4A, a generalized system block diagram of one implementation of a secure communications pipe. The general system block diagram includes an additional software-based cryptography module 470 installed on the Remote Computer System, which is not shown in FIG. 1.

Figure 4B:
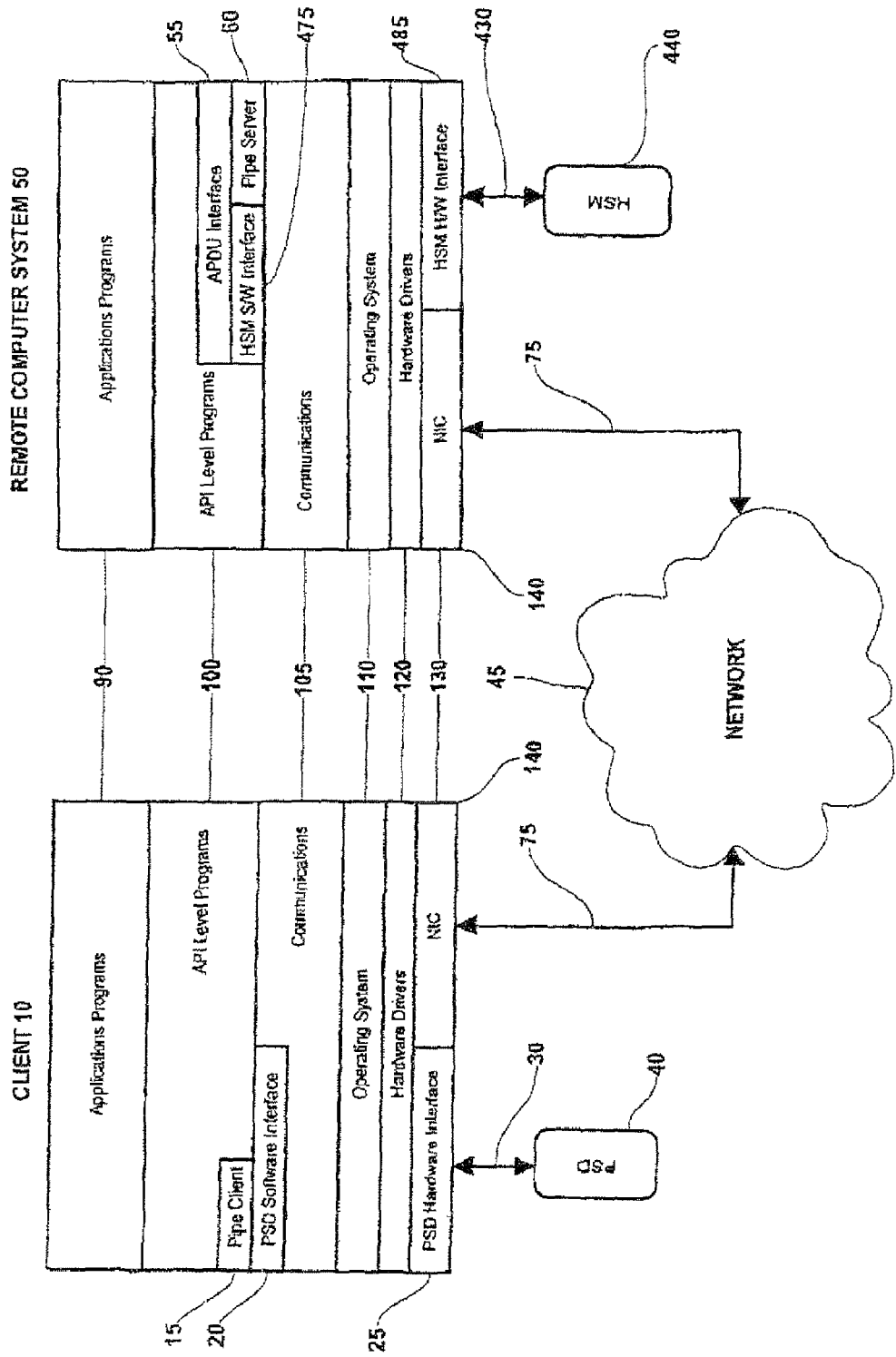
FIG. 4B—is a generalized system block diagram for implementing present invention which includes HSM based security mechanisms.

FIG. 4B depicts an alternative to using software-based security mechanisms. In this alternative embodiment of the invention, a Hardware Security Module (I-ISM) 440 Is employed to perform cryptographic functions. To access the HSM a software driver referred to as an HSM S/W Interface 475, is included in the API Level 100. The HSM software driver communicates with a physical device interface included in the Physical Device Layer 130. The physical device interface is installed on the I/O bus of the Remote Computer System, and is referred to as an HSM H/W Interface 485. The HSM module 440 is connected 430 to the HSM H/W Interface a manner analogous to the PSD connection to the PSD Interface previously described. The use of HSM technologies provides end-to-end security, which further reduces the possibility of unauthorized disclosure of cryptographic or sensitive information.

Both APDU messaging security mechanisms shown in FIGS. 4A & 4B are used to generate cryptographic keys necessary to unlock secure functions and data contained within the secure domain of a PSD, encrypt outgoing APDUs and decrypt incoming encrypted APDUs. The security mechanisms employed in generating a secure pipe may include synchronous, asynchronous or any combination of cryptography methods.

Secure communications protocols used to communicate over a network are accomplished by Communications Programs contained within the Communications Layer 105. Cryptography used in generating secure communications may employ the security mechanisms described for APDU messaging, employ separate mechanisms or employ any combination thereof.

Figure 5:
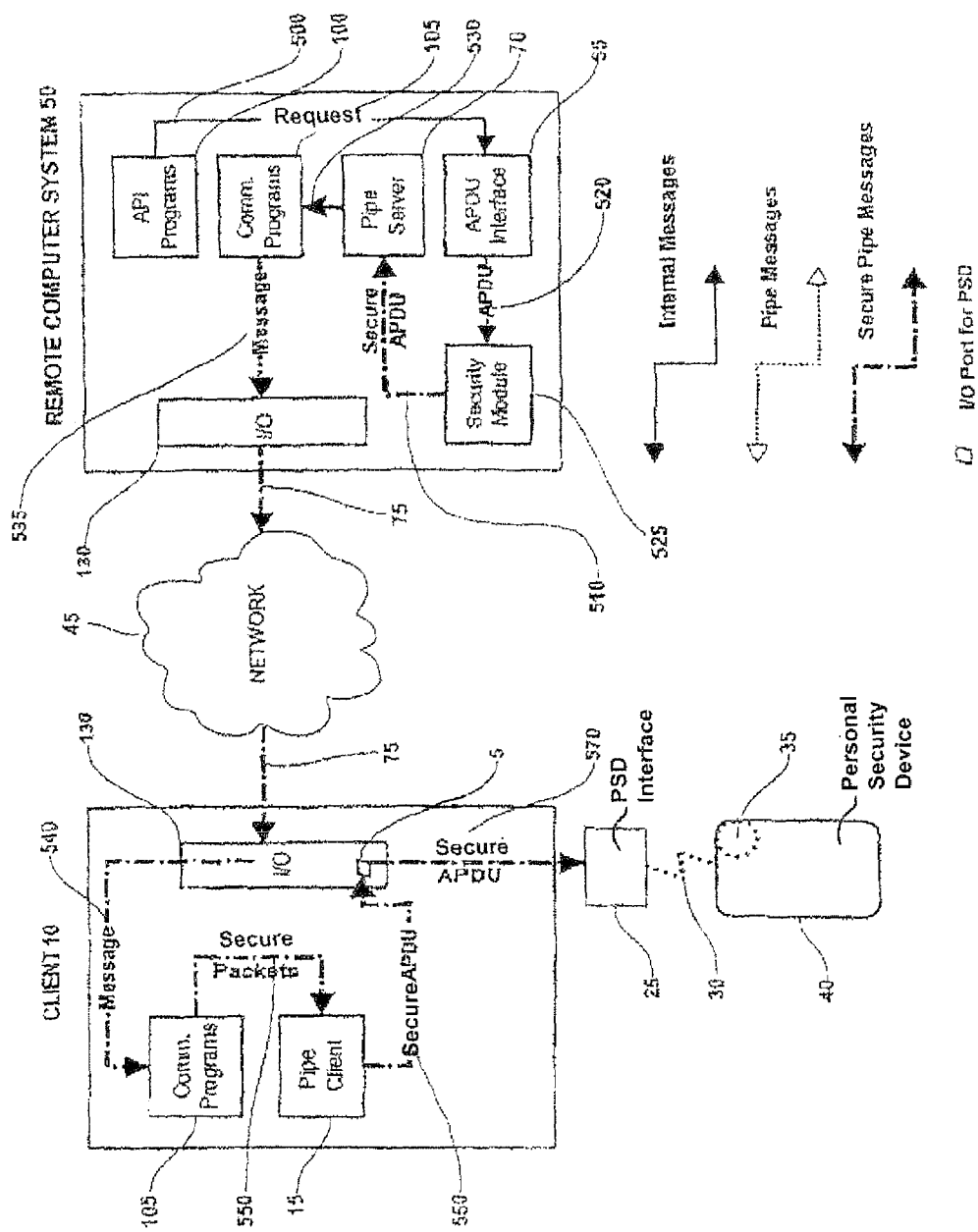
FIG. 5—is a detailed block diagram depicting initiating a secure remote pipe.

Referring now to FIG. 5, depicts the initiating a secure pipe between the Remote Computer System and the PSD 40 connected to Client 10. In this depiction, Remote Computer System 50 is sending a secure request to PSD 40 for proprietary embedded information 35, for example an authentication password. PSD 40 is connected 30 to the local Client 10 using PSD Interface 25. PSD Interface 25 communicates with the Client 10 via hardware device port 5.

To initiate a remote secure pipe between Remote Computer System 50 and PSD 40, a request 500 is generated on Remote Computer System 50 to access PSD 40 by way of API programs 100 which are translated into APDU format by the APDU Interface 55. The APDUs are then sent 520 to a Security Module 525 for encryption using a pre-established cryptography method. The proper cryptographic parameters may be determined by using a look-up table or database, which cross-references the PSD's unique internal identification information with one or more codes necessary to implement the appointed cryptography method.

The encrypted APDUs are then routed 510 to the Pipe Server 70 for message encapsulation. The encapsulated APDUs are then sent 530 to the Communications Programs 105 for processing, encryption using a pre-established secure communications protocol and incorporation into outgoing message packets 535. The secure message packets 535 containing the encrypted and encapsulated APDUs are transmitted 75 over the network 45 via a network interface card (I/O) 130.

The Client 10, receives the message packets 540 containing the encrypted and encapsulated APDUs which are received from the network 45 via a network interface card (I/O) 130 installed on the local Client.

The incoming encrypted message packets are decrypted and processed using the pre-established cryptography employed in the secure communications protocol by client-side Communications Programs contained in the Communications Layer 105. The unencrypted message packets still containing the encrypted APDUs are routed 550 into the Pipe Client 15 for APDU extraction. The extracted APDUs are sent 560 through hardware device port 5, routed 570 into the PSD Interface 25 and sent to PSD 40 via connection 30 for decryption and processing within the secure domain 35 of the PSD 40. Using a pre-established cryptography method, incoming secure ARDUs are decrypted and requests processed.

Figure 6:
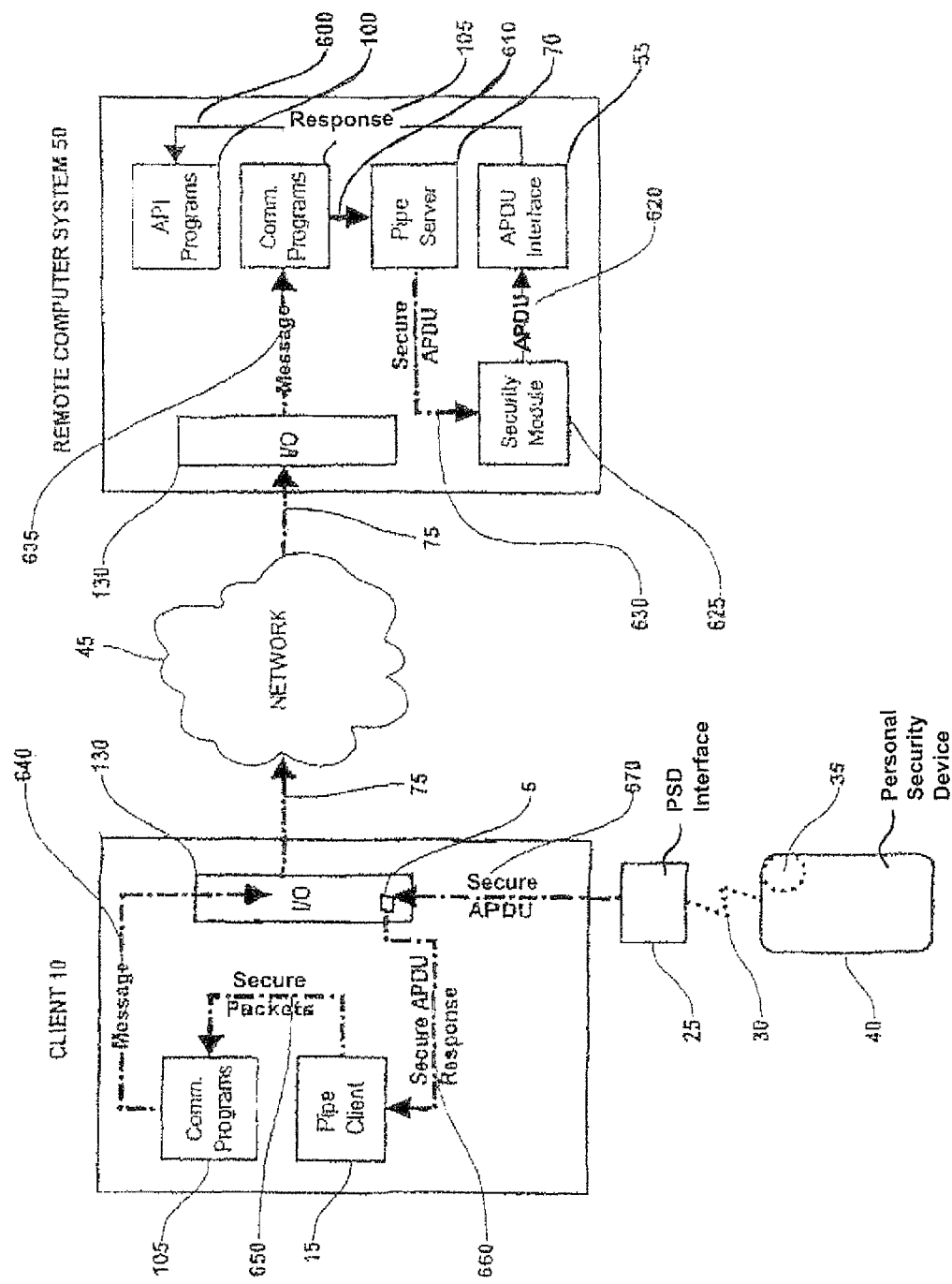
FIG. 6—is a detailed block diagram depicting establishing a secure remote pipe.

Referring now to FIG. 6, depicts a PSD secure response, which establishes the secure communications pipe between PSD 40 and Remote Computer System 50. In this depiction, the secure request previously received is processed within the secure domain 35 of the PSD 40, which causes the PSD to generate a secure response message using a pre-established cryptography method.

The PSD secure response is sent in APDU format from PSD 40 through connection 30 and into PSD interface 25. The PSD secure response is then routed 670 through hardware device port 5 and sent 660 to the Pipe Client 15 for processing and encapsulation. The resulting message packets are then sent 650 to the Client-side Communications Programs 105 for processing, encryption using a pre-established secure communications protocol and incorporation into outgoing message packets 640. The message packets 640 containing the encapsulated APDUs are transmitted 75 over the network 45 via a network interface card (I/O) 130.

The Remote Computer System 50, receives the message packets 635 containing the encapsulated APDUs from the network 45 via a network interface card (I/O) 130 installed on the Remote Computer System. The incoming messages are processed and decrypted using the pre-established cryptography method employed in the secure communications protocol by the server-side Communications Programs 105 and routed 610 into the Pipe Server 70 for secure APDU extraction. The extracted secure APDUs are sent 630 to the Security Module 625 for decryption of the secure APDUs using the pre-established cryptography method. The decrypted APDUs are then routed 620 to the APDU Interface 55 for processing and translation into a higher-level format and sent 600 to API Level programs 100 for processing and further transactions with the PSD 40 if desired. This step establishes the secure "pipe" to communicate with the PSD. The secure pipe is maintained until the Remote Computer System signals the Client to close the hardware interface port 5.

No limitation is intended in the number of PSDs and Clients forming secure pipes 75 with one or more Remote Computer Systems 50; nor should any limitation on the number of Remote Computer Systems 50 available for generating secure pipes 75 be construed from the drawings. Lastly, no limitation is intended concerning the initiating event to establish a communications pipe.

The foregoing described embodiments of the invention are provided as illustrations and descriptions. They are not intended to limit the invention to precise form described. In particular, It is contemplated that functional implementation of the invention described herein may be implemented equivalently in hardware, software, firmware, and/or other available functional components or building blocks. Other variations and embodiments are possible in light of above teachings, and it is not intended that this Detailed Description limit the scope of invention, but rather by the claims following herein.

What is claimed is:

1. A method of establishing a communications pipe between a PSD and a remote computer system over a network using a client as a host to said PSD, wherein said client and said remote computer system are in functional communications using a packet based communications protocol over said network, said method comprising:

generating a request to access said PSD on said remote computer system, wherein said request is in a non-native protocol for communicating with said PSD and said request is generated by an API Level Program, converting on said remote computer system said request from said non-native protocol into a PSD protocol data unit format message using a first server data processing section, encapsulating on said remote computer system said PSD protocol data unit format message into said packet based communications protocol producing an encapsulated request message, using a second server data processing section, transmitting said encapsulated request message over said network using said packet based communications protocol, receiving by said client said encapsulated request message sent over said network, processing said encapsulated request message using a first data processing section to separate said PSD protocol data unit format message from said encapsulated request message, routing on said client said PSD protocol data unit format message through a hardware device port assigned to a PSD Interface independently of the origin and integrity of said encapsulated request message, wherein said PSD Interface is in processing communication with said PSD, receiving by said PSD said PSD protocol data unit format message through said PSD Interface and processing said PSD protocol data unit format message using a first internal PSD data processing section, generating a response message in APDU format by said PSD using a second internal PSD data processing section and transmitting said APDU format response message through said PSD Interface, receiving by said client said APDU format response message through said PSD Interface and encapsulating said APDU format response message into said packet based communications protocol producing an encapsulated response message, using a second data processing section, transmitting said encapsulated response message over said network using said packet based communications protocol, receiving said encapsulated response message sent over said network by said remote computer system, processing said encapsulated response message using a third server data processing section to separate said APDU response message from said encapsulated response message thus generating a desencapsulated APDU response message, and converting by said remote computer system said desencapsulated APDU response message into a response in a non-native protocol using a fourth server data processing section, and forwarding said response to at least one API Level Program.

2. The method according to claim 1 wherein said network is a public network.

3. The method according to claim 1 wherein said network is a private network.

4. The method according to claim 1 wherein said protocol is an open communications protocol.

5. The method according to claim 1 wherein said protocol is a secure communications protocol.

6. The method according to claim 1 wherein said communications pipe is initiated automatically upon connection of said PSD to said local client.

7. The method according to claim 1 wherein said communications pipe is initiated by a client requesting access to information contained on one or more networked clients.

8. The method according to claim 1 wherein said communications pipe is initiated by a client requesting access to information contained on one or more networked remote computer systems.

9. The method according to claim 1 wherein said communications pipe is initiated by one or more networked remote computer systems requesting access to said P SD.

10. A method of establishing a secure communications pipe between a PSD and a remote computer system over a network using a client as a host to said PSD, wherein said client and said remote computer system are in functional communications using a packet based communications protocol over said network, said method comprising:

generating a request to access said PSD on said remote computer system, wherein said request is in a non-native protocol for communicating with said PSD and said request is generated by an API Level Program, converting on said remote computer system said request from said non-native protocol into a PSD protocol data unit format message using a first server data processing section, and sending said PSD protocol data unit format message to a cryptography data processing section, receiving and encrypting said PSD protocol data unit format message using cryptography data processing section thus generating an encrypted request message and sending said encrypted request message to a second server data processing section, wherein said cryptography data processing section uses a pre-established encryption method, encapsulating on said remote computer system said encrypted request message into said packet based communications protocol producing an encapsulated and encrypted request message, using said second server data processing section, transmitting said encapsulated and encrypted request message over said network using said packet based communications protocol, receiving said encapsulated and encrypted request message sent over said network by said client, processing said encapsulated and encrypted request message using a first client data processing section to separate said encrypted request message from said encapsulated and encrypted request message thus generating a desencapsulated encrypted request message, routing on said client said desencapsulated encrypted request message through a hardware device port assigned to a PSD Interface independently of the origin and integrity of said encapsulated and encrypted request message, wherein said PSD Interface is in processing communication with said PSD, receiving said desencapsulated encrypted request message through said PSD Interface by said PSD and decrypting said desencapsulated encrypted request message using an internal PSD data cryptography section thus generating a desencapsulated and decrypted request message, wherein said cryptography section is pre-established, and sending said desencapsulated and decrypted request message to a first internal PSD data processing section, receiving said desencapsulated and decrypted request message from said internal PSD data cryptography section and processing said desencapsulated and decrypted request message using said first internal PSD data processing section, generating a response message in APDU format by said PSD using a second internal PSD data processing section, encrypting said APDU format response message using said internal PSD data cryptography section thus generating an encrypted APDU format response message and transmitting said encrypted APDU format response message through said PSD Interface, receiving by said client said encrypted APDU format response message through said PSD Interface and encapsulating said encrypted APDU format response message into said packet based communications protocol producing an encapsulated and encrypted response message, using a second client data processing section, transmitting said encapsulated and encrypted response message over said network using said packet based communications protocol, receiving by said remote computer system said encapsulated and encrypted response message sent over said network, processing said encapsulated and encrypted response message using a third server data processing section to separate said encrypted APDU response message from said encapsulated and encrypted response message thus generating a desencapsulated encrypted APDU response message, decrypting said desencapsulated encrypted APDU response message received from said third server data processing section using said cryptography data processing section thus generating a desencapsulated and decrypted APDU response message and sending said desencapsulated and decrypted APDU response message to said fourth server data processing section, and converting by said remote computer system said desencapsulated and decrypted APDU response message into a response in a non-native protocol using a fourth server data processing section, and forwarding said response to at least one API Level Program.

11. The method according to claim 10 wherein said network is a public network.

12. The method according to claim 10 wherein said network is a private network.

13. The method according to claim 10 wherein said protocol is an open communications protocol.

14. The method according to claim 10 wherein said protocol is a secure communications protocol.

15. The method according to claim 10 wherein said secure communications pipe is initiated by a client requesting access to information contained on one or more networked clients.

16. The method according to claim 10 wherein said secure communications pipe is initiated by a client requesting access to information contained on one or more 15 networked remote computer systems.

17. The method according to claim 10 wherein said secure communications pipe is initiated by one or more networked remote computer systems requesting access to said PSD.

18. The method according to claim 1 wherein said network is a hardwired network.

19. The method according to claim 1 wherein said network is a digital cellular network.

20. The method according to claim 1 wherein said network is a wireless network.

21. The method according to claim 1 wherein said network is an optical network.

22. The method according to claim 1 wherein said network is a telephone acoustical network.

23. The method according to claim 10 wherein said network is a hardwired network.

24. The method according to claim 10 wherein said network is a digital cellular network.

25. The method according to claim 10 wherein said network is a wireless network.

26. The method according to claim 10 wherein said network is an optical network.

27. The method according to claim 10 wherein said network is a telephone acoustical network.

28. A method of establishing a remote communications pipe between a PSD and a remote computer system over a network using a local client as a host to said PSD, wherein said local client is in functional connection with a PSD interface, and wherein said local client and said remote computer system are in functional communications using a packet based communications protocol over said network, said method comprising:

the local client transmitting and receiving message packets respectively to and from said remote computer system over said network using a packet based communications protocol, and transmitting and receiving APDUs through said PSD interface;

the local client receiving incoming message packets from said remote computer system, separating encapsulated APDUs from said incoming message packets thus generating desencapsulated APDUS and routing said desencapsulated APDL is to said PSD through said PSD Interface independently of the origin and integrity of said incoming message packets;

the local client receiving incoming APDUs from said PSD interface, encapsulating said incoming APDUs into outgoing message packets and routing said outgoing message packets to said remote computer system;

at least one remote computer system comprising a section that functionally connects to said network and a section that functionally communicates with said local client and further comprising:

a server communications section that transmits and receives messages over said network using said packet based communications protocol;

a first server data processing section that receives requests from at least one applications level program, translates said requests into APDU format and transmits said APDU formatted requests to a second server data processing section, a second server data processing section that encapsulates said APDU formatted requests received from said first server data processing section into outgoing message packets and transmits said outgoing message packets over said network to said local client using said server communications section, a third server data processing section that receives incoming messages from said local client using said server communications section and separates encapsulated APDUs from said incoming message packets thus generating desencapsulated APDUs and routing said desencapsulated APDUs to a fourth server data processing section; and a fourth server data processing section that receives and translates said desencapsulated APDUs sent by said third server data processing section into another message format thus generating a translated message and transmitting said translated message to at least one applications level program.

* * * * *